(12) United States Patent
Leeb et al.

(10) Patent No.: US 6,198,230 B1
(45) Date of Patent: Mar. 6, 2001

(54) DUAL-USE ELECTRONIC TRANSCEIVER SET FOR WIRELESS DATA NETWORKS

(75) Inventors: Steven B. Leeb, Belmont; George B. Hovorka, Rowley, both of MA (US); Deron Jackson, San Jose, CA (US); Elmer C. Lupton, Boston, MA (US)

(73) Assignee: Talking Lights, Boston, MA (US)

( * ) Notice: Subject to any disclaimer, the term of this patent is extended or adjusted under 35 U.S.C. 154(b) by 0 days.

(21) Appl. No.: 09/291,706

(22) Filed: Apr. 14, 1999

Related U.S. Application Data

(60) Provisional application No. 60/081,866, filed on Apr. 15, 1998, provisional application No. 60/108,287, filed on Nov. 13, 1998, and provisional application No. 60/115,374, filed on Jan. 11, 1999.

(51) Int. Cl.[7] .................................................. H05B 37/02
(52) U.S. Cl. .................... 315/224; 315/200 R; 315/307; 315/360
(58) Field of Search .............................. 315/224, 200 R, 315/205, 247, 291, 307, 360, DIG. 4, DIG. 5, DIG. 7; 250/271, 493.1; 340/286.02, 309.15, 310.03; 455/73, 75

(56) References Cited

U.S. PATENT DOCUMENTS

| | | | |
|---|---|---|---|
| 3,156,826 | 11/1964 | Mutschler | 250/199 |
| 3,194,965 | 7/1965 | Ruff et al. | 250/199 |

(List continued on next page.)

FOREIGN PATENT DOCUMENTS

| | | |
|---|---|---|
| 196 07 468 | 2/1996 | (DE) . |
| 0 456 462 | 5/1991 | (EP) . |
| 60-32443 | 8/1983 | (JP) . |
| 1-122220 | 5/1989 | (JP) . |
| WO 95/11558 | 4/1995 | (WO) . |
| WO 98/02846 | 1/1998 | (WO) . |

OTHER PUBLICATIONS

Wilkins, et al. "Fluorescent lighting, headaches and eyestrain," Lighting Res. Technol., vol. 21(1); pp. 11–18 (1989).

Buffaloe "Fluorescent Lamp Optical Communication Scheme," MIT Dept. of Electrical Engineering & Computer Science, Thesis, pp. 1–49, May 28, 1996.

Buffaloe, et al. "Fiat Lux: A Fluorescent Lamp Transceiver," MIT Paper, Feb. 1997.

Jackson, et al. "Fiat Lux: A Fluorescent Lamp Transceiver," IEEE Transactions on Industry Applications, vol. 34, No. 3, pp625–630, May/Jun. 1998.

Light Beam Communicator advertisement, Ramsey Electronics, Inc., Feb. 11, 1999.

*Primary Examiner*—Don Wong
*Assistant Examiner*—Thuy Vinh Tran
(74) *Attorney, Agent, or Firm*—Sam Pasternack; Brenda H. Jarrell; Choate, Hall & Stewart

(57) ABSTRACT

An apparatus for generating electromagnetic radiation in which the radiation has both a first and second utility. The electromagnetic radiation is modulated to produce electronically detectable variations to achieve the second utility, the variations not affecting the first utility. In one embodiment, the electromagnetic radiation is visible light. In this embodiment, the first utility is illumination and the second utility is the transmission of data. In another embodiment, the invention provides a lamp for generating visible light capable of providing illumination and transmitting data to a receiver. Any variations in the visible light resulting from the data transmission are imperceptible by a human eye regardless of the nature of the data being transmitted.

54 Claims, 12 Drawing Sheets

U.S. PATENT DOCUMENTS

| | | | |
|---|---|---|---|
| 3,900,404 | 8/1975 | Dachs | 250/199 |
| 4,199,261 | 4/1980 | Tidd et al. | 356/448 |
| 4,493,114 | 1/1985 | Geller et al. | 455/617 |
| 4,540,243 | 9/1985 | Fergason | 350/337 |
| 4,704,563 * | 11/1987 | Hussey | 315/DIG. 4 |
| 5,020,155 | 5/1991 | Griffin et al. | 455/617 |
| 5,278,536 * | 1/1994 | Furtaw et al. | 340/310 A |
| 5,363,020 | 11/1994 | Chen et al. | 315/209 R |
| 5,424,859 | 6/1995 | Uehara et al. | 359/152 |
| 5,550,434 | 8/1996 | King et al. | 315/160 |
| 5,598,326 | 1/1997 | Liu et al. | 363/34 |
| 5,616,901 | 4/1997 | Crandall | 235/379 |
| 5,623,358 | 4/1997 | Madey | 359/172 |
| 5,635,915 | 6/1997 | Gray | 340/825.57 |
| 5,657,145 | 8/1997 | Smith | 359/181 |
| 5,687,136 | 11/1997 | Borenstein | 367/116 |
| 5,757,530 | 5/1998 | Crandall, Jr. | 359/182 |
| 5,838,116 * | 11/1998 | Katyl et al. | 315/307 |

* cited by examiner

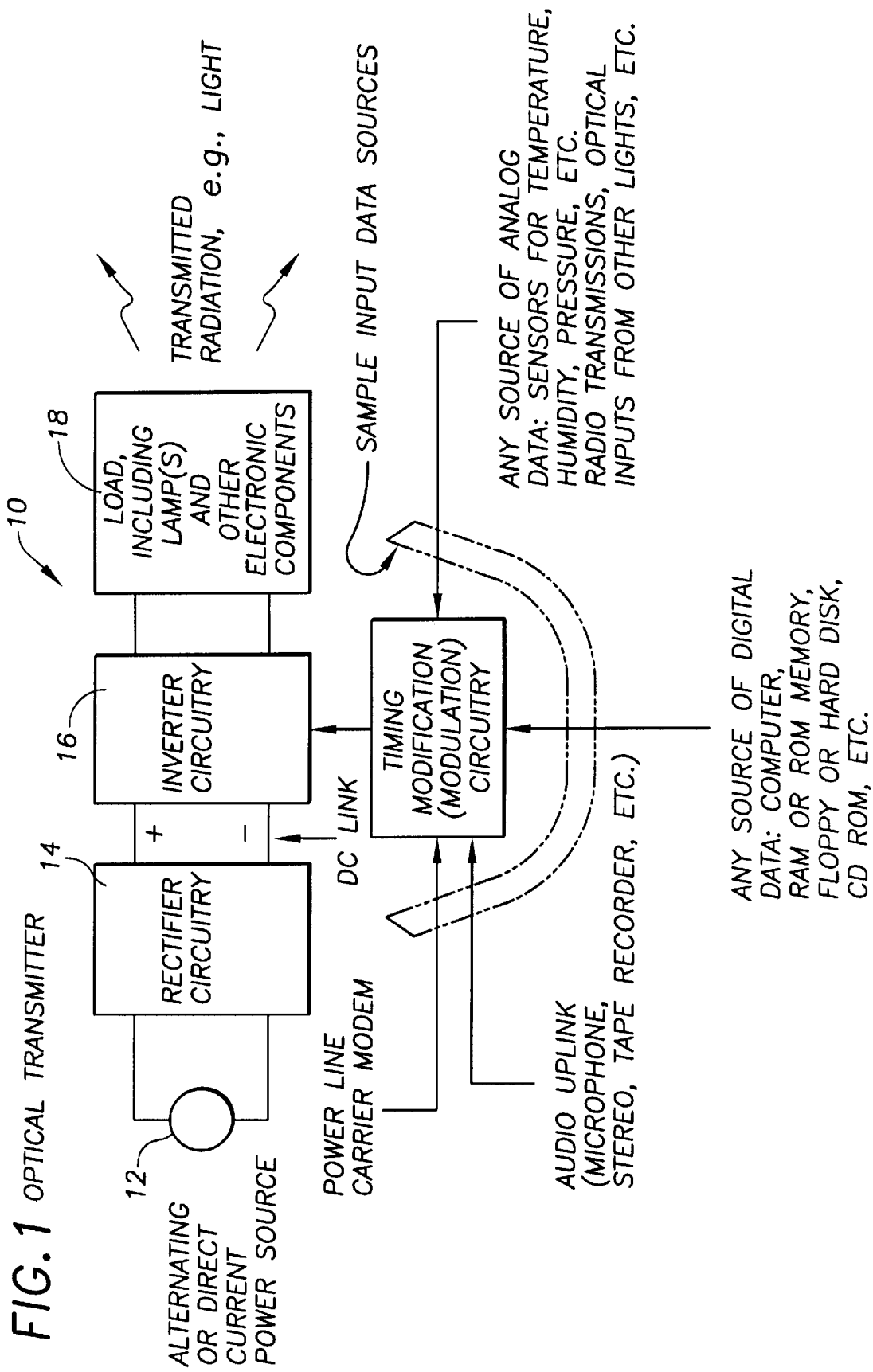
FIG. 1 OPTICAL TRANSMITTER

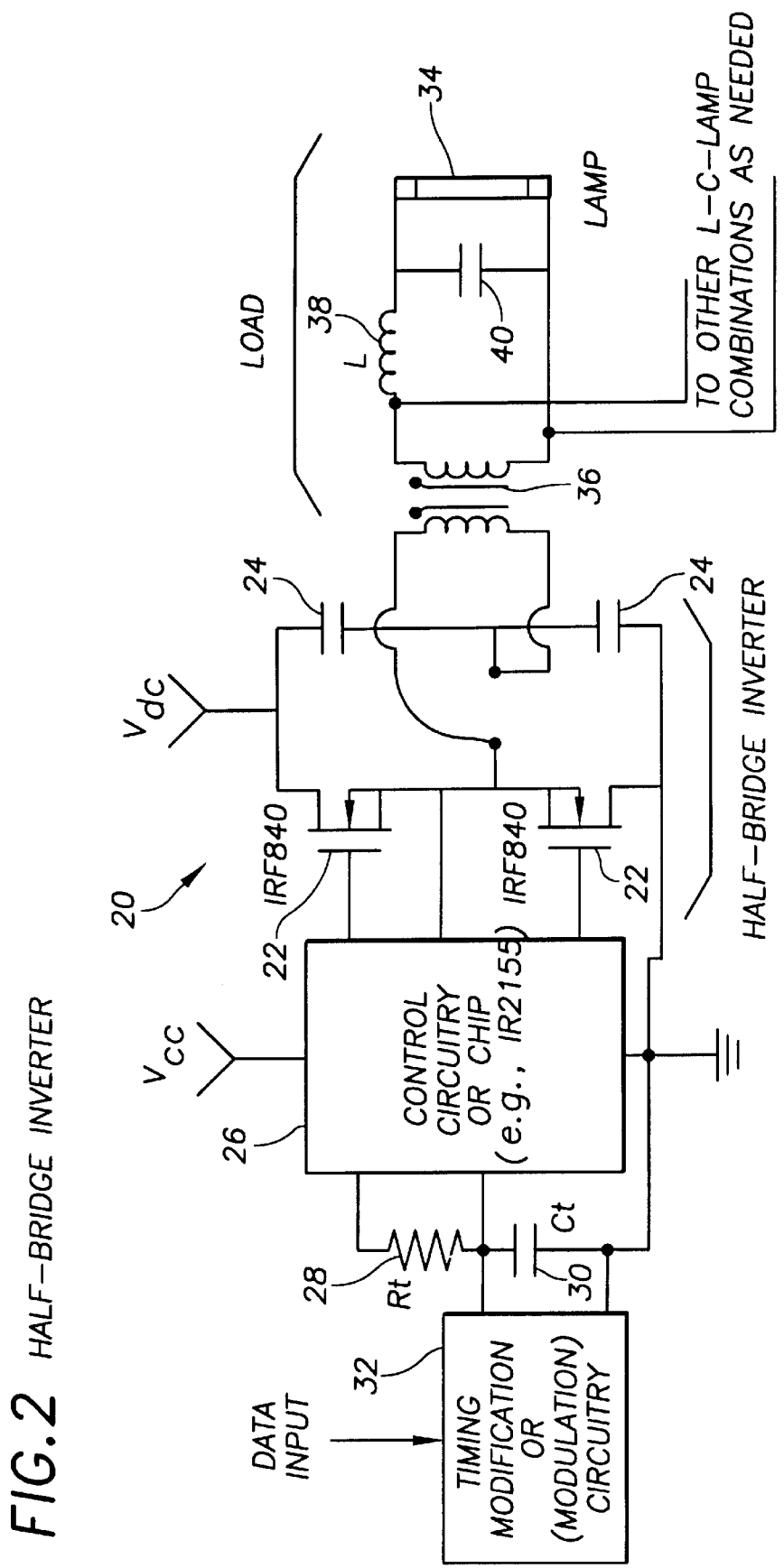
FIG.2 HALF-BRIDGE INVERTER

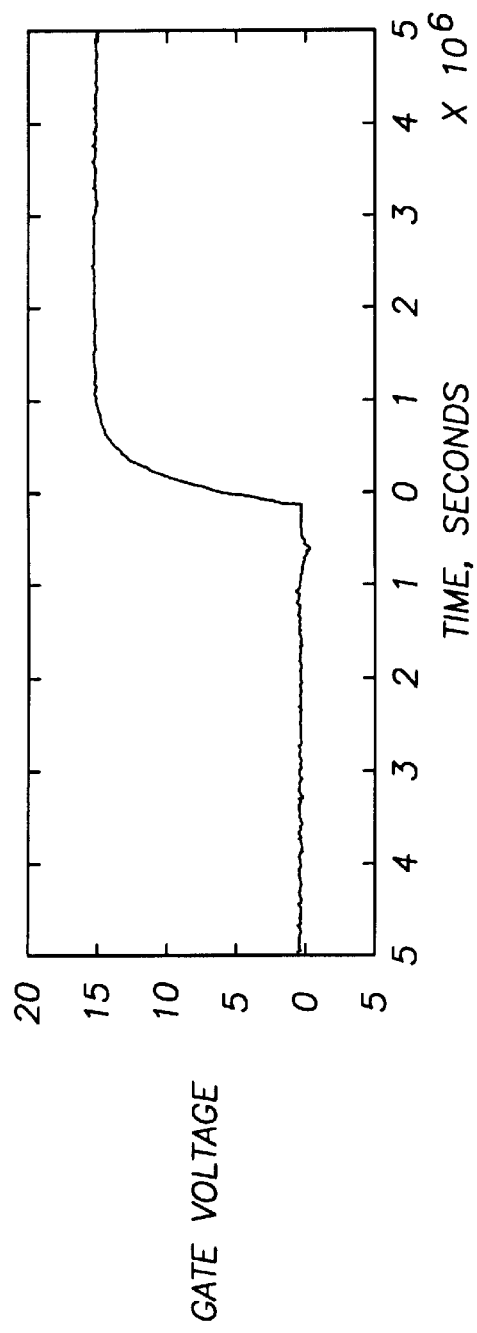
FIG.3a ZERO VOLTAGE SWITCHING
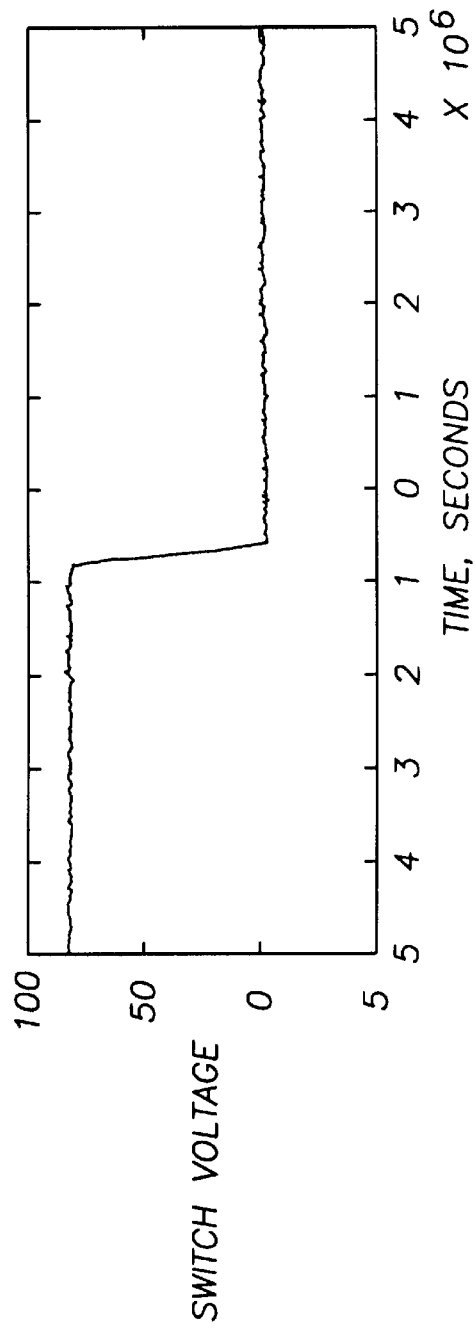
FIG.3b ZERO VOLTAGE SWITCHING

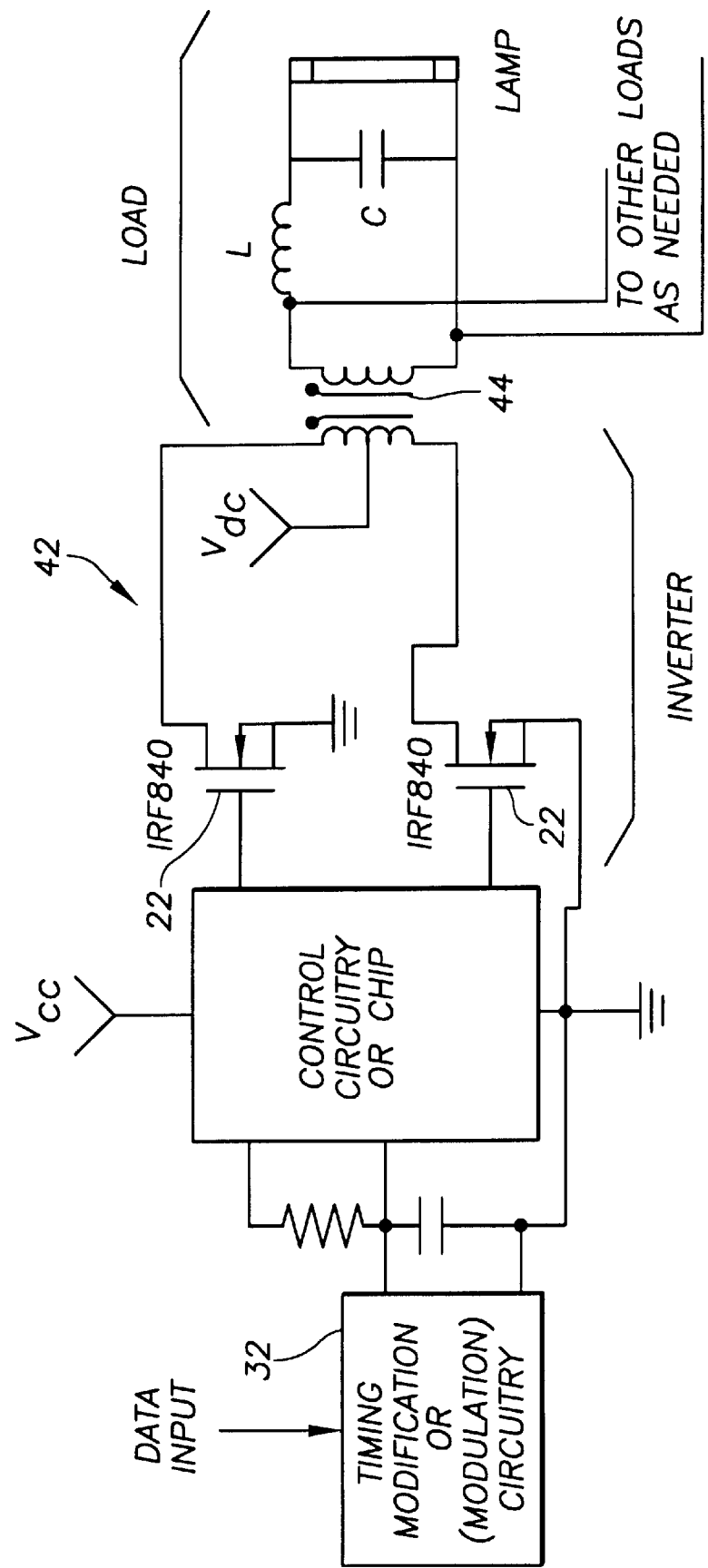
FIG. 4    ALTERNATE INVERTER CONFIGURATION

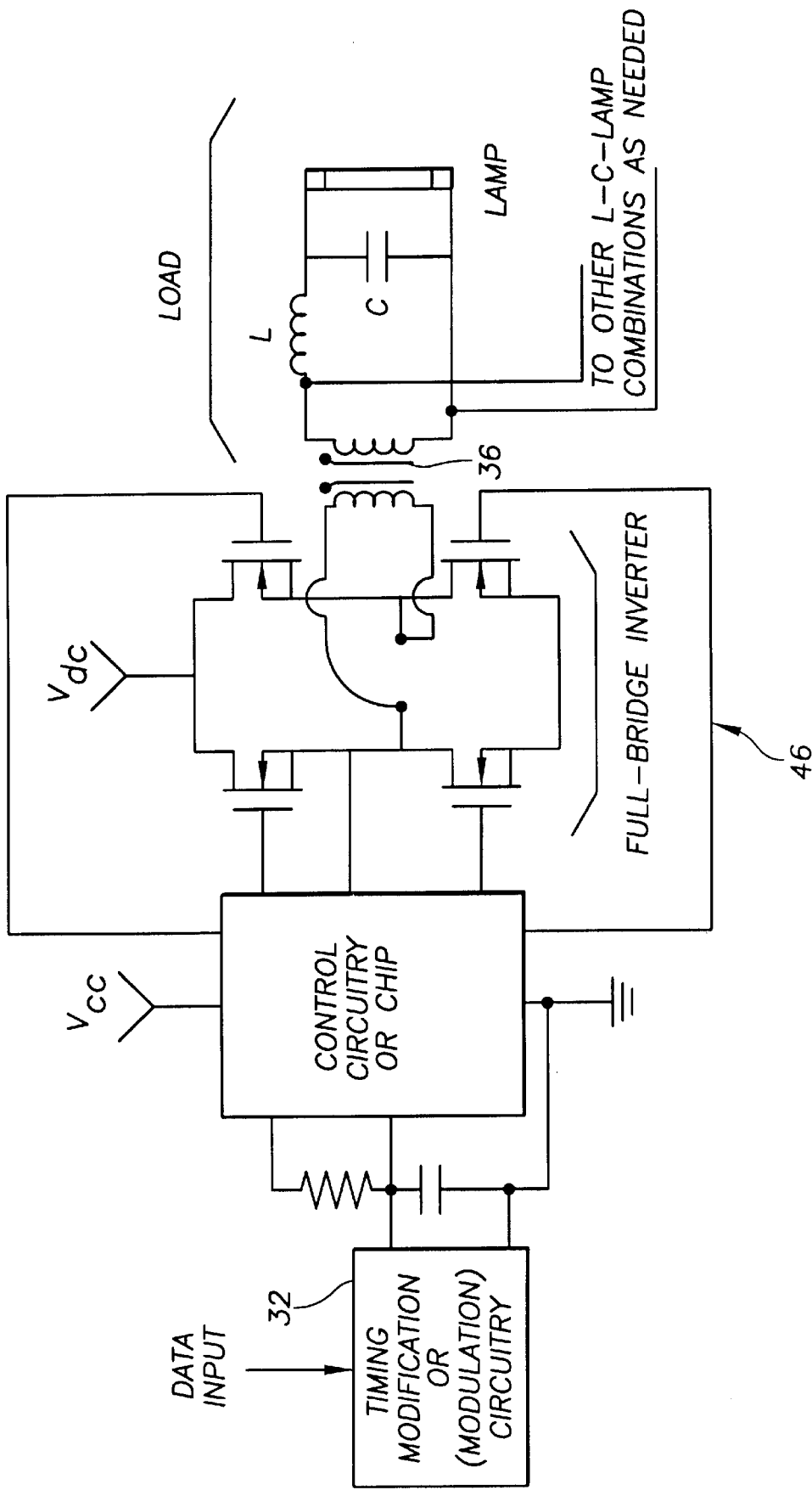
FIG. 5  ALTERNATE FULL-BRIDGE INVERTER CONFIGURATION

FIG. 6a SAMPLE LOAD CONFIGURTIONS.
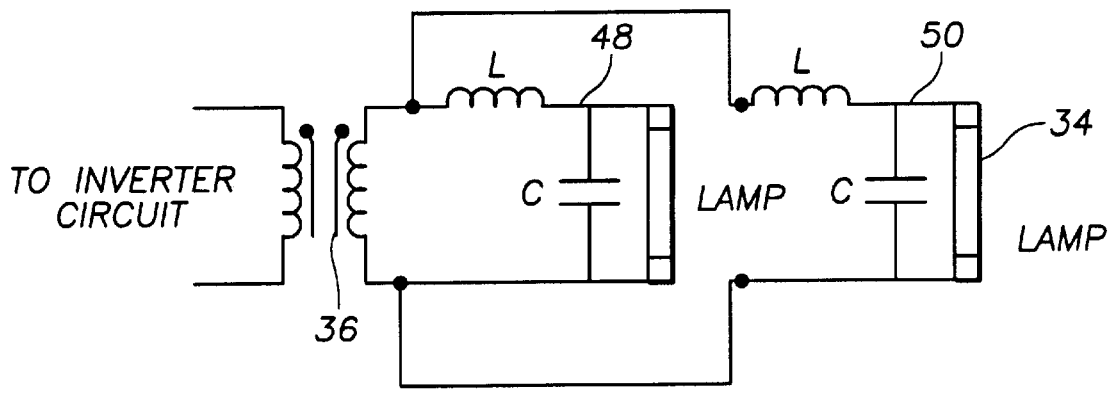
FIG. 6b SAMPLE LOAD CONFIGURTIONS.
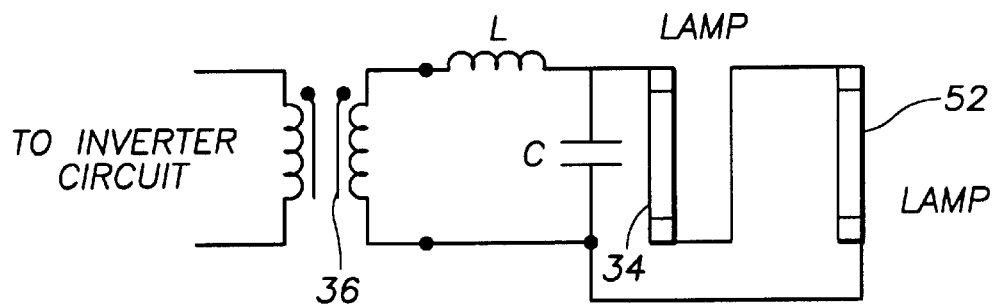
FIG. 6c SAMPLE LOAD CONFIGURTIONS.
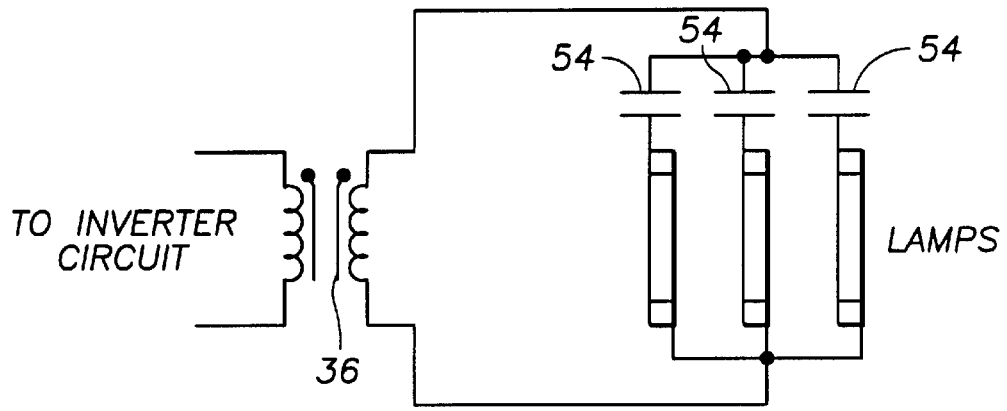

FIG. 7a MODULATION CIRCUITS.
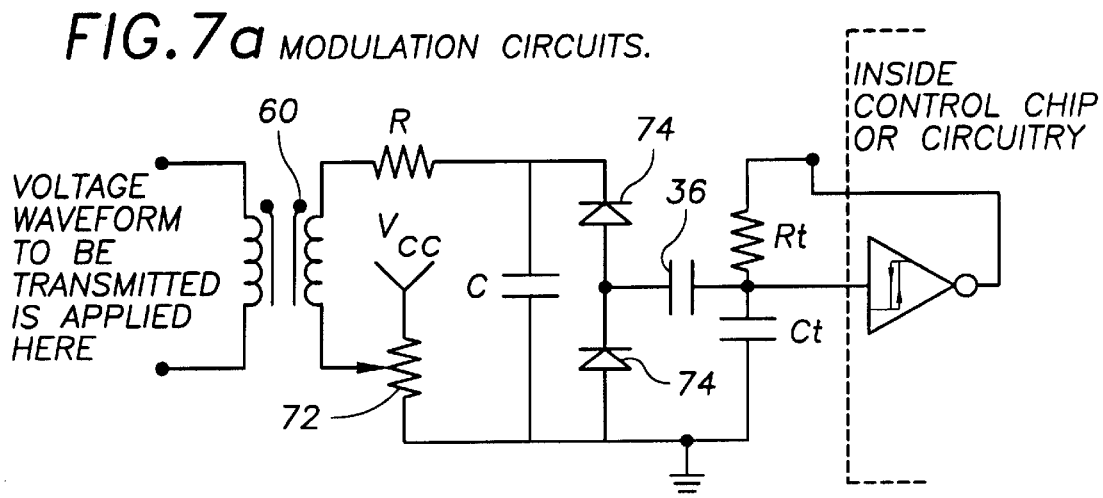
FIG. 7b MODULATION CIRCUITS.
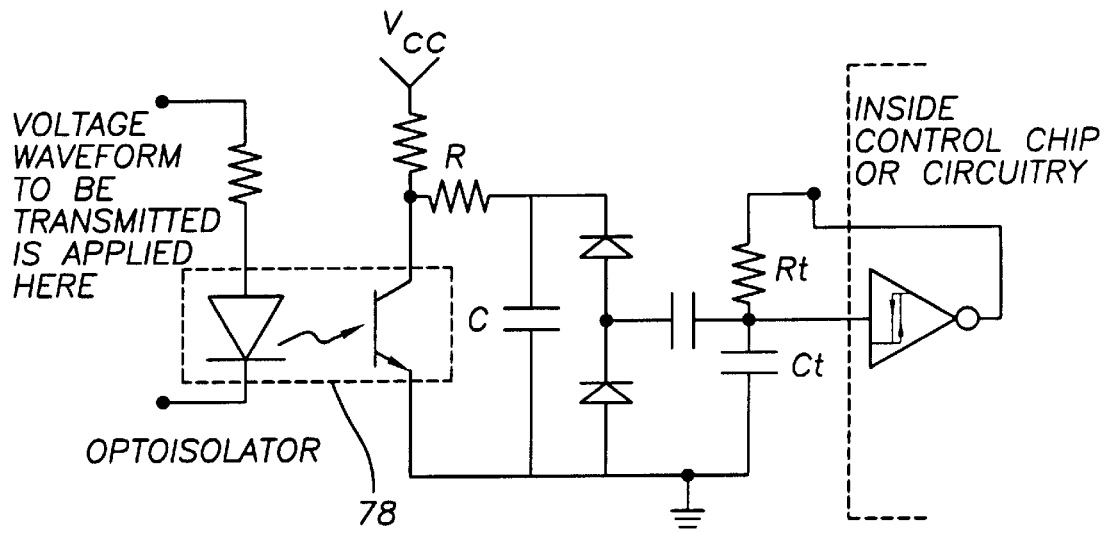
FIG. 7c MODULATION CIRCUITS.
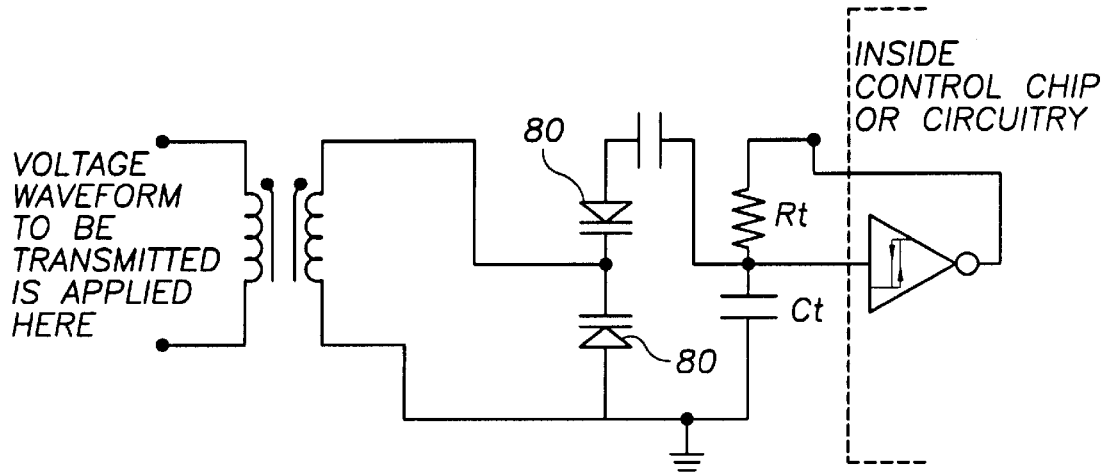

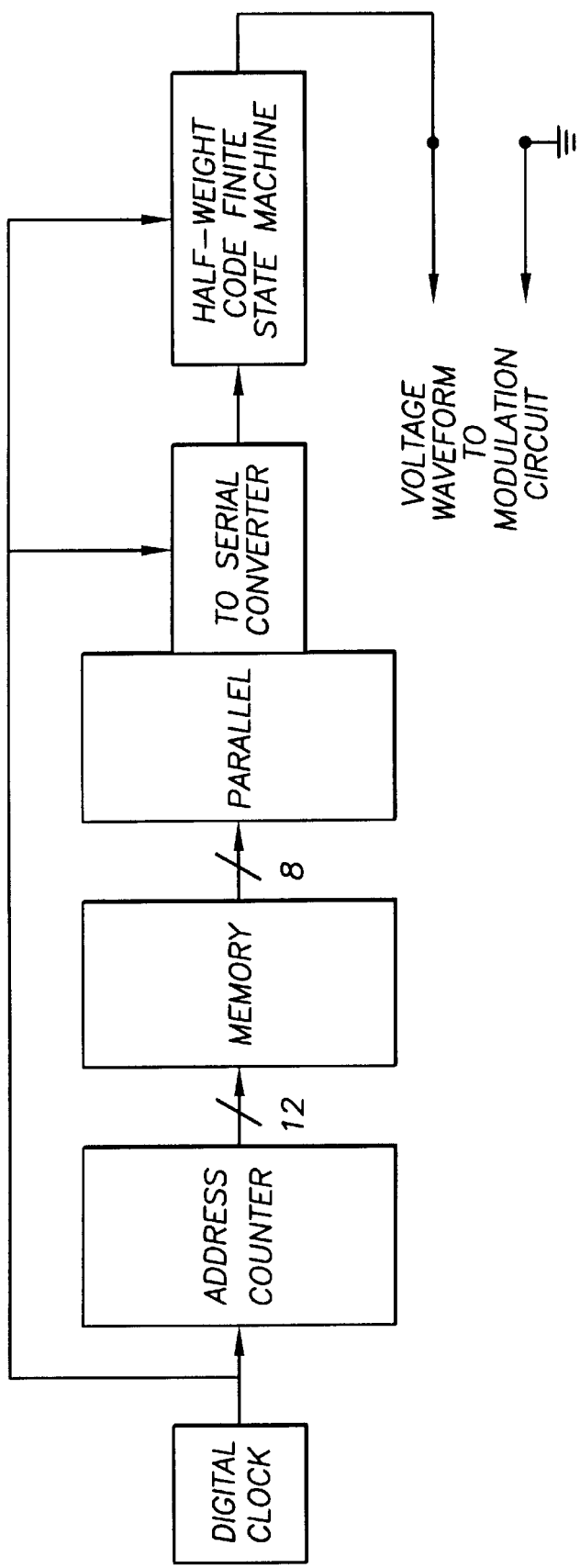
FIG. 12 DIGITAL DATA ENCODER.

DUAL-USE ELECTRONIC TRANSCEIVER SET FOR WIRELESS DATA NETWORKS

This application claims benefit to 3 U.S. Provisional applications: Provisional application Ser. No. 60/081,866 filed Apr. 15, 1998, Provisional application Ser. No. 60/108,287 filed Nov. 13, 1998, Provisional application Ser. No. 60/115,374 filed Jan. 11, 1999.

FIELD OF THE INVENTION

The present invention relates to the simultaneous dual use of radiation, e.g. visible light, for both a conventional application, e.g., illumination, combined with the additional application of transmitting information without wires. The present invention further relates to electronic ballast circuits for electric discharge lamps, e.g., fluorescent lamps. The present invention further relates to the application of a time-varying, modulated current through the lamp to produce electronically detectable variations in the lamp light that are invisible to the human eye. The present invention further relates to coding information in variations in the lamp light for purposes of transmitting all kinds of information, including, but not limited to, digital data, audio, textual, and graphical signals. The present invention further relates to efficient coding schemes to maximize the bandwidth or information transfer capability of the optical data channel. Wide bandwidth and efficiency are critical for intranets or other wide area networks that could be carried on the lighting in an office or factory. The present invention further relates to efficient power electronic circuits capable of producing modulated currents in a lamp with high power efficiency, maximum data rate, and the possibility of incorporating needed safety features such as galvanic isolation. The present invention further relates to the construction of receivers for detection of the modulated information in the lamp light.

BACKGROUND OF THE INVENTION

Over half of the artificial light produced in the United States comes from lamps in which an electric discharge through a gas is used to produce illumination (J. Waymouth, *Electric Discharge Lamps*, MIT Press, Cambridge, Mass., 1971). The prevalence of electric discharge (e.g., fluorescent) illumination has led us to develop ways to inexpensively use discharge lamps for communication.

The basic idea of using lighting to send information as well as to provide illumination appears to have originated at least as early as 1975 (M. Dachs, "Optical Communication System," U.S. Pat. No. 3,900,404, August 1975). In the Dachs patent, the inventor discloses an analog amplitude-modulation (AM) scheme to modulate the arc current in a fluorescent lamp, the "carrier" signal, with an audio information signal. A more recent patent (K. King, R. Zawislak, and R. Vokoun, "Boost-Mode Energization and Modulation Circuit for an Arc Lamp," U.S. Pat. No. 5,550,434, August 1996) discloses an updated electronic circuit that also provides for AM modulation of the arc current with an analog signal. Such techniques are generally undesirable for the direct transmission of data since, among other reasons, low frequency content in the data may lead to perceptible flicker in the light output, and the noise immunity of the overall transceiver system is not optimal. Techniques for encoding digital information have been described in M. Smith, "Modulation and Coding for Transmission using Fluorescent Lamp Tubes," U.S. Pat. No. 5,657,145, August 1997 and T. Gray, "Transmission System," U.S. Pat. No. 5,635, 915, June 1997 which employed either a pulsed AM or a phase modulation technique, respectively. Both techniques transmitted data at a rate that is on the same order of magnitude as that of the power-line frequency (50/60 Hz), i.e., relatively slowly compared to typical modem lamp arc frequencies in the range of 20,000 to 40,000 Hertz. Other communication schemes have also been proposed that do not use the lamp light as the carrier, but instead use the lamp fixture as an antenna for transmitting conventional radio wave or microwave signals. In K. Uehara and K. Kagoshima, "Transceiver for Wireless In-Building Communication Sytem [sic]," U.S. Pat. No. 5,424,859, June 1995, for example, the inventors disclose techniques for mounting a microwave antenna on the glass surface of fluorescent and incandescent lamps.

In T. Buffaloe, D. Jackson, S. Leeb, M. Schlecht, and R. Leeb, "Fiat Lux: A Fluorescent Lamp Transceiver," Applied Power Electronics Conference, Atlanta, Ga., June 1997, the authors outlined the possibility of using pulse-code modulation to transmit data with a fluorescent lamp. This scheme made use of a tri-level pulse coding, which led to a ballast design with a relatively high-complexity compared to the architectures described in the present invention. Also, the associated receiver was more complicated, and unable to support the high data rates achievable with the present invention.

We have invented a communication network based on frequency modulated radiation (e.g., visible light) that eliminates the disadvantages of the systems in the prior art. It enables higher power commercial scale lighting systems to be used to transmit the signal. It eliminates undesirable visual flicker in the system and so allows simultaneous continuous use of the lighting fixtures as lighting while also providing the medium for communication. It allows analog, digital or analog/digital data to be sent and received. It increases the bandwidth available to transmit data, and it enables a number of applications, such as multiple digital data streams, to be performed using a single lamp. Improvements made in the current invention can result in unprecedented performance advantages in the operation and implementation of lamp transceiver systems.

This invention is the first to propose establishing a transceiver system using any radiating transmitter with dual utility where the primary utility is any application, not just illumination but also possibly range finding, lane marking, or other applications, and the secondary utility is communication. This invention is the first to propose the transmission of bandlimited analog information such as audio signals by using frequency modulation, which enhances the noise immunity and available bandwidth over previous schemes while specifically avoiding sensory perceptible flicker in the transmission. It is the first to propose the efficient transmission of digital data using pulse code frequency modulation, and also the first to propose encoding digital bits in sidebands around the carrier frequency of the transmitter. It is the first to propose the use of a nonlinear detector in a dual-use network receiver to improve settling and detection time of pulse-coded data. These schemes for the transmission and reception of digital data substantially enhance the available data transmission rate in comparison to schemes in the prior art, again while elimination perceptible flicker. It is the first to disclose schemes for creating multiple data transmission channels using the same transmitter, and the first to propose a receiver in a "dual-use" network capable of selecting one channel from a spectrum of available choices. It is the first to propose a receiver with variable "lock-in" or transmitter capture characteristics, allowing the tailoring of the behavior of the receiver as it locks on to different transmitters. This feature could be especially important for optimizing the receiver's behavior in way-finding applications, and in environments with many different closely spaced transmitters, to ease the process of acquiring and holding a data channel between the transmitter and receiver.

SUMMARY OF THE INVENTION

In one aspect, the invention is apparatus for generating electromagnetic radiation in which the radiation has both a first and a second utility. The electromagnetic radiation is modulated to produce electronically detectable variations to achieve the second utility, the variations not affecting the first utility. In one embodiment, the second utility is transmission of information. In this embodiment, the electromagnetic radiation is visible light in which the first utility is illumination and the second utility is the sending of information, the variations in the visible light being invisible to the human eye. Suitable apparatus is a lamp which may, for example, be a fluorescent, cold cathode or a high-intensity discharge lamp. Any transmitter of radiated energy could be used, however, including light emitting diodes, lasers or radio wave antennas.

In another aspect, the invention is a lamp for generating visible light to provide illumination and to transmit information to a receiver in which the variations in the light as a result of the information transmission are undetectable to the human eye. The lamp includes a source of visible light and circuitry including a ballast for modulating the output of the source to send information by means selected from the group including analog FM, sideband encoded digital pulse code FM, discrete pulse code FM with two level coding, and any other orthogonal bit coding scheme. The circuitry may further include a rectifier for drawing power from an AC source and controlling the power to have substantially the same shape and phase, but possibly different amplitude, as the AC source to insure near-unity-power-factor operation. An inverter is connected to receive power from the rectifier to create a high frequency alternating wave form, the output of the inverter forming an input to the lamp. It is preferred that the inverter include means for varying the frequency of the voltage produced by the inverter. It is also preferred that the inverter is operated with zero-voltage or zero current switching.

In particular, the present invention pertains, in part, to electronic circuits capable of controlling and modulating the arc current in a lamp. The circuits include means to draw power from a direct or alternating (utility) source. The circuits further include means to control or limit the magnitude of the current flowing in a lamp or collection of lamps. The circuits further include means to vary the current in the lamp to encode information in the lamp light with no visible flicker.

By "lamp", as that term is used herein, it is meant a device that produces radiated transmissions, including, but not limited to, infra-red, visible, and ultra-violet light, in response to an input electrical current which flows in the lamp. A typical example is a fluorescent lamp, although other types, such as high-intensity discharge lamps, light emitting diodes, lasers, cathode ray tubes, particle beam emitters, liquid crystal displays, electroluminescent panels, klystrons, and masers are also intended. Emitters of other types of radiation, such as radio antennae for applications in RADAR sets, ultrasonic transducers, and mechanical fans ("radiating" air or water for instance) are also intended.

By "ballast", as that term is used herein, it is meant a circuit that controls the amplitude, frequency, and phase of the current waveform in the lamp. By "rectifier", as used herein, it is meant a circuit that takes as input a voltage waveform from a power source and produces a DC or predominantly DC output voltage waveform.

By "inverter", as used herein, it is meant a circuit that takes as input a low frequency or DC electrical voltage waveform from a power source. The inverter produces a high frequency voltage waveform that can be applied to the lamp, or a lamp in combination with other electrical components such as inductors or capacitors. The frequency and phase of this output voltage waveform can be controlled by the inverter.

By "switch", as used herein, it is meant a device that can either block or permit the flow of electric current in response to a low-power-level control signal. Typical examples of a switch include a bipolar junction transistor, a MOSFET, or an insulated-gate bipolar junction transistor (IGBT).

By "load", as used herein, it is meant a lamp or lamps, possibly in combination with other electrical components including inductors, capacitors, resistors, and transformers, which are added to ensure that proper and safe operating voltages and currents are, or can be by virtue of control actions taken by the inverter, applied to the lamp or lamps. Typically, the load is connected to the output of an inverter.

In one embodiment of the invention, a system that is capable of controlling the current in a discharge or fluorescent lamp is provided. A rectifier circuit is used to draw power from the AC utility. The current drawn from the AC utility by the rectifier circuit is actively controlled to have the same shape and phase, but possibly a different amplitude, as the AC utility voltage waveform, ensuring near-unity-power-factor operation. The power drawn from the AC utility is used to create a predominantly DC output voltage with little alternating or ripple voltage. This DC voltage serves as the input to an inverter circuit.

The inverter circuit draws power from the DC bus and creates a high frequency alternating waveform that can be applied to the lamp, or the lamp in combination with other electrical components including transformers, inductors, or capacitors. For example, the inverter can be used to apply an AC square wave to the primary of a transformer whose secondary is connected to a series combination of an inductor and a capacitor and lamp in parallel. The inverter circuit includes special means to vary the frequency of the voltage produced by the inverter circuit. The frequency can, for example, be varied to encode information in the output voltage waveform and, therefore, the light produced by the lamp. To maximize efficiency, the inverter is operated with zero-voltage switching. For example, switches are turned on only when the voltage across the switch is zero, ensuring a nearly lossless turn-on transition. In another embodiment, the inverter circuit could be energized directly by a DC or low frequency alternating power source, eliminating the need for a rectifier circuit. This mode of operation is particularly attractive in environments, e.g., automobiles or other transportation systems, where DC power is available a priori. Again, the inverter circuit includes special means to vary the frequency of the voltage produced by the inverter circuit. The frequency can, for example, be varied to encode information in the output voltage waveform and, therefore, the light produced by the lamp. Again, to maximize efficiency, the inverter is operated with zero-voltage switching. For example, switches are turned on only when the voltage across the switch is zero, ensuring a nearly lossless turn-on transition.

In either case, a receiver can be constructed which remotely samples the lamp light from a distance and decodes the information in the light encoded by the ballast.

BRIEF DESCRIPTION OF THE DRAWINGS

The invention will be understood with reference to the drawings, in which:

FIG. 1 is a schematic illustration of the system of the invention.

FIG. 2 is an electronic schematic diagram of a high frequency half-bridge inverter which may be used to drive a load.

FIGS. 3a and 3b show oscilloscope traces of the gate drive and switch voltage waveforms in an inverter operated with zero-voltage switching (ZVS).

FIG. 4 is an electronic schematic diagram of a high frequency half-bridge inverter driving the primary of a center-tapped transformer whose secondary may be used to drive a load.

FIG. 5 is an electronic schematic diagram of a high frequency full-bridge inverter which may be used to drive a load.

FIGS. 6a, 6b and 6c are schematic diagrams of possible load configurations.

FIGS. 7a, 7b and 7c are schematic diagrams of three possible modulation circuits for modifying the operating frequency of the inverter circuit.

FIG. 12 is a block diagram showing a finite-state machine that could be used to encode digital data transmission through the modulation circuits.

DETAILED DESCRIPTION OF THE INVENTION

Figure 8:
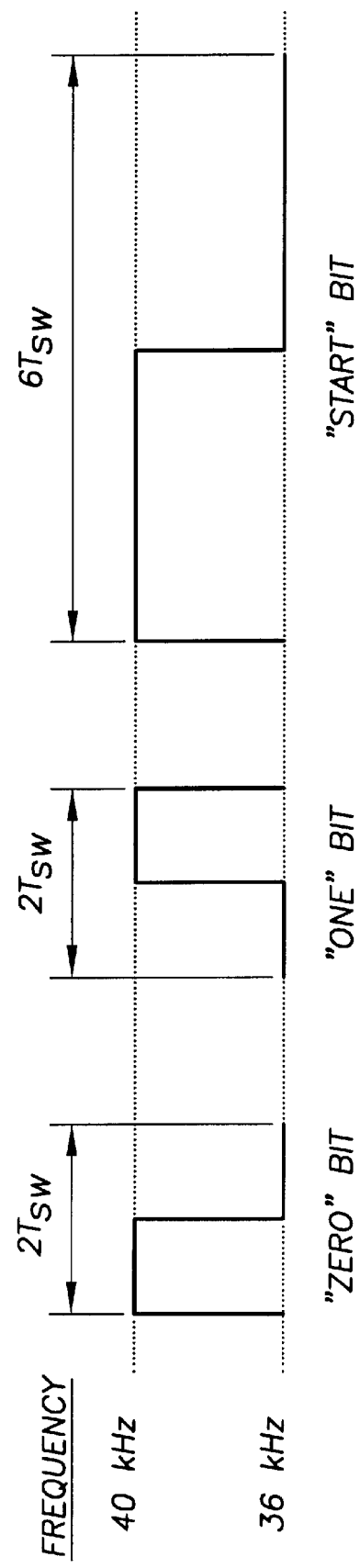
FIG. 8 is a graphical representation of a half-weight bit pattern.

The present invention transmits information over a free space optical data pathway. Transmission is accomplished by modulating or varying the frequency of the alternating current in an electric discharge lamp such as a fluorescent lamp. A typical discharge lamp requires a relatively high starting or striking voltage across it's terminals to form an arc or electric discharge in the lamp. Once the arc forms, it is essential to reduce the voltage across the lamp, lest an excessive current flow through the lit lamp, destroying it. The purpose of an electronic lamp ballast is at least twofold, therefore. The ballast must provide an adequately high voltage to initiate arc formation and light production. After starting, the ballast serves to limit the current through the lamp, ensuring satisfactory light production and long lamp life. The present invention adds a third function to the ballast. A means is provided to vary the frequency of the lamp current to encode information for transmission in the lamp light.

An overview of this new ballast is shown in FIG. 1. Ballast 10 draws power 30 from an alternating or direct current electric power source 12. This power is processed by a rectifier pre-regulator circuit 14, which may perform several functions, including actively wave-shaping the input current to provide near-unity-power factor operation. The rectifier 14 also provides a DC output voltage or DC link that serves as the input to the next stage in the ballast 10, an inverter 16. It should be noted that there are a wide range of possibilities for implementing this rectifier stage, including actively controlled pre-regulator circuits designed around well known power electronic switching power supplies such as the buck, boost, or flyback converters (not shown). This stage might or might not provide safety isolation by incorporating a transformer, as needed. It might also be a very simple stage, consisting of as little as a capacitor or simply a pair of connecting wires if the ballast is to operate from a DC source voltage, as might be the case in a transportation system such as an automobile or bus, where a 12 volt DC supply may be conveniently available, for example.

The inverter circuit 16 operates from the DC link voltage provided by the rectifier 14. The inverter 16 acts to create a high-frequency AC voltage waveform to be applied to a load circuit 18 that includes one or more lamps. There are a tremendous number of inverter circuit topologies and switching schemes that could be used for this application. One possibility, for example, is shown in FIG. 2. A half-bridge inverter 20 shown in the figure consists of two IRF840 MOSFETs 22 and two capacitors that divide the DC link voltage, $V_{dc}$. A control circuit 26 acts to activate first the bottom MOSFET, and then the top MOSFET, and then repeats this pattern. One complete cycle of the pattern will be called a switch period. A wide range of chips or circuits could be used to control the two MOSFETs in the inverter 20. One possibility, for example, would be to use the IRF2155 half-bridge control circuit 26, which contains drivers for the MOSFETs and a built in timing circuit to determine the time interval that constitutes a switch period. This interval can be controlled by the ballast designer in the case of the IR2155 control chip by selecting the values of the resistor Rt 28 and the capacitor Ct 30. A critical innovation in the present invention is the addition of modulation circuitry 32 to modify the behavior of the timing circuitry to permit frequency modulation of the inverter AC waveform for the purpose of encoding information for transmission at the highest possible bandwidth or data rate while ensuring that the lamp 34 light exhibits no perceptible flicker regardless of the information content of the transmitted data. This information could come from any source of analog or digital waveforms, as shown in FIG. 1, including, for example, audio signals from a tape recorder or microphone or digital data from a computer, disk drive, or power line carrier modem.

The inverter block 16 shown in FIG. 1, and illustrated as a half-bridge circuit 20 in FIG. 2, is used to drive a load circuit that consists of the lamp 34 and possibly other electronic elements such as inductors, capacitors, and/or transformers. A specific example is shown in FIG. 2, in which the load consists of a transformer 36 driving a series combination of an inductor 38 and the parallel combination of a capacitor 40 and the lamp 34. The transformer 36 can provide at least two important functions. It may provide galvanic safety isolation, especially if the rectifier circuit 14 that provides $V_{dc}$ does not incorporate means for isolating the circuit. It may also provide a change in the voltage level from the primary winding (driven by the inverter) to the secondary winding (connected to the inductor, capacitor, and lamp) in order, for instance, to enhance available striking voltage. The inductor 38 and capacitor 40 in this load serve as a high-Q resonant circuit when the lamp 34 is off, i.e., before the arc strikes, which can also provide significant striking voltage if the inverter frequency is near the resonant frequency. Once the lamp 34 strikes, the lamp 34 effectively dominates the combined impedance of the capacitor/lamp pair, and the inductor serves to limit the current flowing through the lamp in steady-state operation.

The two MOSFETs 22 in the inverter must never be turned on simultaneously, in order to avoid short circuiting the input voltage $V_{dc}$. If a delay is left by the control circuit between the time that one switch is turned off and the next switch is turned on, it is possible to operate the inverter with highly efficient, zero-voltage switched turn on transitions. This is illustrated in our experimental prototype by the waveforms shown in FIGS. 3a and 3b. The top oscilloscope photo of FIG. 3a shows the delay between the activation signal for the top MOSFET and the bottom MOSFET. The bottom oscilloscope photo of FIG. 3b shows that the drain-to-source voltage on the bottom MOSFET, for example, rings to zero volts and is clamped by the MOSFET body diode before the bottom MOSFET is turned on by its control signal. In the half-bridge inverter, ZVS is ensured by leaving a delay between the switch activations and by ensuring that the inductor 38 is large enough to store sufficient energy to ring the drain-to-source voltage to zero.

Two of an innumerable number of possible configurations for an inverter circuit are shown in FIGS. 4 and 5. In FIG. 4, an inverter 42 has been modified to include a center-tapped transformer 44. This configuration has the advantage of allowing both MOSFET control gates 22 to be driven with respect to ground. However, it also raises the complexity of the transformer manufacturing by requiring a center-tapped primary. In FIG. 5, an inverter 46 has been modified to be a full-bridge, four switch inverter. This circuit has the advantage of applying the full voltage $V_{dc}$, as opposed to $V_d/2$ in the half-bridge, making it potentially easier to develop a high striking voltage. However, it also requires four switches and possibly four control lines from the control circuitry.

These inverter configurations all typically drive the load with a predominantly sinusoidal arc current. Other inverter configurations could be used, at the risk of increasing the lamp current crest factor, to drive a current consisting of the sum of two or more distinct carrier frequency sinusoids. Each of these sinewaves could be modulated with a different information signal, enabling the possibility of using a single lamp to send multiple channels of information, for which a receiver could individually tune and detect.

Three different example load configurations, again from an almost innumerable number of variations, are illustrated in FIGS. 6a, 6b and 6c. In each of the three cases, it is assumed that the load is driven by the high frequency output of some inverter circuit. The load configuration in FIG. 6a illustrates the use of a single transformer 36 to drive multiple L-C-Lamp circuits 48,50, permitting a multi-lamp fixture and ballast. The load circuit of FIG. 6b also permits the operation of multiple lamps 34,52 by connecting the lamps in series. This configuration minimizes the need for additional inductors and capacitors, but requires a high transformer turns ratio and/or high-Q L-C circuit to provide the high striking voltage needed to activate a series combination of lamps. Also, in this configuration, if a single lamp fails, the entire fixture (both lamps 34,52 in the figure, for example) will cease to produce light. The third circuit shown in FIG. 6c can be used to activate one or more lamps in parallel. The capacitors 54 serve as ballasting or current limiting elements, and striking voltage is provided by a transformer with a sufficient turns ratio to provide high voltage to the lamp/capacitor combinations. This configuration requires a transformer 36 with a high turns ratio, and has the advantage that the failure of one lamp will generally not interfere with the operation of the other, parallel lamp circuits. Note that other enhancements, such as the addition of a positive-temperature coefficient thermistor (not shown) in parallel with each lamp, might be made in any of the load configurations to enhance starting and prolong cathode life.

In a multi-lamp fixture, notice that several configurations are possible. As shown in FIGS. 6a, 6b and 6c, several loads could be connected to the same inverter, increasing the total radiated power of a particular signal. It is understood, however, that individual lamps in a multi-lamp fixture could be connected to one of several inverter circuits with different modulation inputs. In this case, a single lighting fixture could be used to transmit data on multiple channels.

At the heart of the invention is some circuit means to enable frequency modulation or pulse code frequency modulation of the lamp 34 light. For purposes of illustration, it is assumed that the switch period is determined by the action of a hysteresis oscillator, as is found in the IR2155 or the classic 555 timer circuit. A hysteresis comparator or set of comparators is included in the control chip or circuitry.

The switch period is normally set by this comparator and the values of Rt and Ct, which work together to create an oscillator. In the present invention, the timing circuit 32 is modified to permit analog frequency modulation (FM) or digital pulse code modulation of the inverter timing, and therefore the lamp current. It should be understood that a wide range of possibilities exist for determining the timing of a switch period and the pattern of switch activation in the inverter. Any timing circuit that permits frequency modulation or digital pulse code modulation (W. M. Siebert, Circuits, Signals, and Systems, McGraw—Hill, New York, N.Y., 1986), e.g., with half-weight block codes, does not depart from the spirit or scope of the invention.

For illustration purposes, three different modulation circuits designed to modulate the behavior of the hysteresis oscillator are shown in FIGS. 7a, 7b and 7c. In the first design of FIG. 7a, the signal to be transmitted over the lamp light, e.g., an analog audio signal from a tape recorder or microphone, is received through an audio transformer 60 which can provide both voltage level conversion and safety isolation. The AC audio signal at the secondary of the transformer 60 is level-shifted by the action of a potentiometer 72 to create a signal which consists of an AC signal with a DC offset, ensuring that the voltage applied to R with respect to ground is always non-negative. The impedance of the potentiometer 72 should be low, i.e., on the order of the impedance of the transformer 60 secondary winding or smaller. Also, the resistance of the transformer 60 secondary winding should be large enough (e.g., 600 Ohms or more) to limit the current flowing out of the transformer, thus avoiding magnetic saturation. The filter formed by R and C serves to limit the high frequency content of the input signal. The breakpoint of this filter can be varied by changing the values of R and C to vary the bandwidth or baud rate of the transmitter. In our prototype, for example, R was eliminated entirely, leaving just the filtering provided by C and the transformer secondary impedance. The voltage level on the capacitor C varies slowly with respect to the switch frequency (e.g., half the switch frequency or less). This voltage level couples to the action of the hysteresis oscillator through two diodes 74 and a series capacitor 76. It alters the trigger point of the oscillator, permitting the voltage on C to frequency modulate the oscillator and therefore the inverter. In summary, the level of the slowly varying AC input voltage on the transformer primary ultimately frequency modulates the inverter and the current in the load and lamp.

The circuit in FIG. 7b can also modulate the inverter by similar means. In this case, however, the input signal is presented through an optoisolator 78 instead of a transformer. This design might be most suitable for discrete input data, i.e., data which assumed specific levels such as a digital waveform. However, with the optoisolator 78 with reasonably linear response, this design could also be used to transmit analog signals. Note that if isolation is not necessary, the input waveform could be applied directly to the RC filter.

The circuit in FIG. 7c can also be used to modulate the inverter. In this case, the AC input waveform is again presented through an isolation transformer whose secondary is connected to the middle point of a connection of two series varactor diodes 80. The secondary voltage alters the net capacitance of the two varactor diodes 80, which has the effect of changing the net capacitance in the hysteresis oscillator timing circuit, effectively changing the oscillation frequency. This again permits the AC input voltage to alter or modulate the operation of the inverter.

The present invention transmits coded data by varying the operating frequency of the lamp ballast. If the signal to be transmitted is an analog AC signal with a minimum frequency content above that of the human visual perception range for flicker and a maximum frequency content significantly below the nominal switch frequency of the inverter, it is sufficient to apply the signal directly to the input of one of the modulation circuits in FIGS. 7a, 7b and 7c. This will directly modulate the lamp 34 current and lamp light, and, because the signal is restricted to avoid very low frequency content (e.g., which is inaudible for audio data anyway), the lamp light will not appear to flicker to the human eye. However, to encode a digital or discrete-level message in the lamp light, it is generally not sufficient to simply employ a direct frequency-shift-keying (FSK) scheme. Suppose for example, that we wished to transmit a string of bits, zeros and ones. In a simple FSK scheme a zero bit might be assigned an arc frequency of 36 kHz and a one bit assigned to 40 kHz. In this case, a long run of logic zeros followed by a long run of logic ones would result in a noticeable flicker in light intensity during the transition. Instead, this invention employs coding schemes that ensure that the light will not flicker visibly.

One method is the "sideband FM method," a modification of the approach used to transmit analog signals. Two different frequency values of sidebands around the arc current center frequency are used to represent the binary values. Since the two sidebands are shifted equal but opposite amounts around the carrier or center frequency, the average frequency remains the same and no flicker is observed. The other method involves shifting the base frequency of the light, but using a coding scheme more complex than a simple binary code to represent the signal. The prior art reports a three level code being used with each binary bit being represented by three different frequencies of the light. In this way, the average frequency remains the same. Unexpectedly and fortuitously, we have found that a two value coding, such as Manchester encoding, also allows binary bits to be transmitted with no observable flicker regardless of the nature of the data strings. We will refer to this modulation as "two level coding.".

For example, in one of our prototypes, a two-level half-weighted coding scheme was used to eliminate visible flicker while transmitting digital data. The two level coding is based on Manchester coding, which is common in computer networks.

It is employed to additional advantage in this invention to eliminate visible flicker.

Manchester coding is one of a class of half-weight block codes that are suitable for this application (E. Bergmann, A. Odlyzko, and S. Sangani, "Half Weight Block Codes for Optical Communications," AT&T Technical Journal, Vol. 65, No. 3, May 1986, pp. 85—93). This two-level code shifts the arc frequency every $T_{sw}$ seconds, where a typical value is $T_{sw}$=2 milliseconds. A one or a zero bit does not correspond to a particular arc frequency, but rather, to a two-level pattern in arc frequency. The patterns are illustrated in FIG. 8. Logic one and zero bits are transmitted by patterns of length $2T_{sw}$, and a unique start bit, used to demarcate the beginning of a transmitted byte, is represented by a sequence $6T_{sw}$ in length.

Figure 9A:
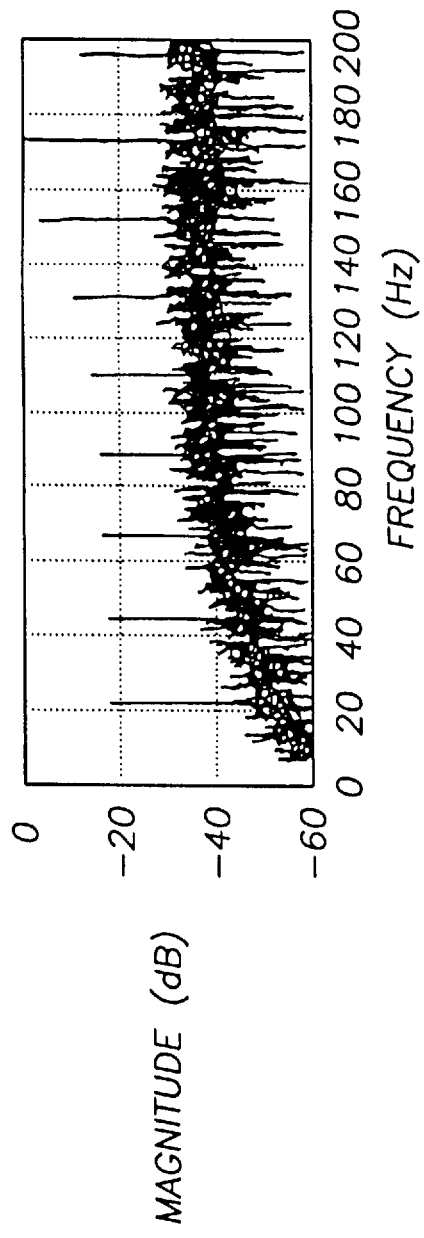
FIGS. 9a and 9b are graphs showing a spectrum comparison illustrating the advantage of half-weight bit coding.
Figure 9B:
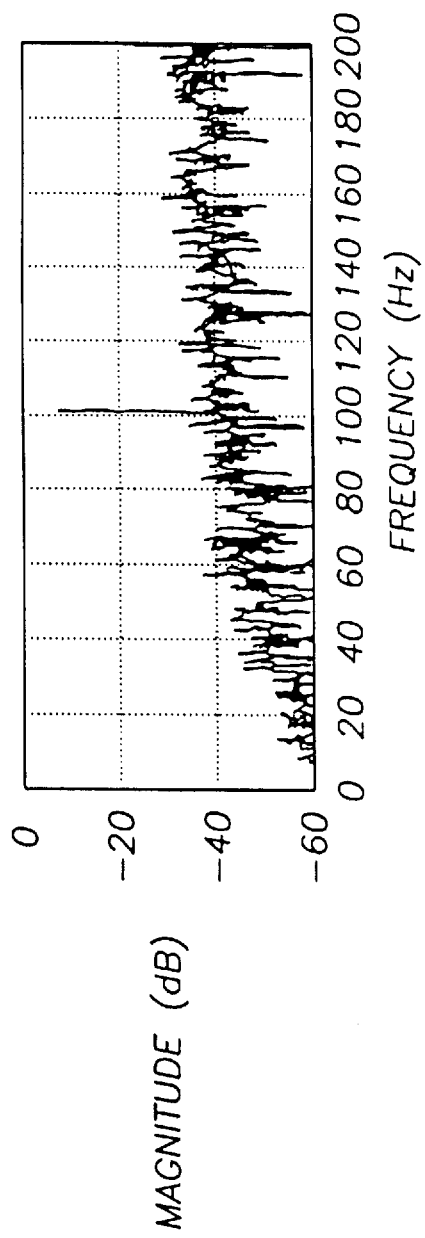

The two level patterns for the zero, one, and start bits have the same average frequency. Thus, for sufficiently rapid switching between the different arc frequencies, i.e., for a sufficiently short interval $T_{sw}$, the lamp exhibits no perceptible flicker, even during transitions between long sequences of zeros and ones. FIG. 9b shows the approximate frequency spectrum of the lamp intensity for the Manchester encoding scheme. The three-level encoding scheme described in T. Buffaloe, D. Jackson, S. Leeb, M. Schlecht, and R. Leeb, "Fiat Lux: A Fluorescent Lamp Transceiver," *Applied Power Electronics Conference*, Atlanta, Ga., June 1997 is included for comparison as shown in FIG. 9a. The vertical axes, in decibels, are normalized with respect to the largest magnitude AC component. The spectrums were calculated assuming linear changes in intensity with frequency and a random stream of message data. The spectrums provide good qualitative estimates of the significant low-frequency components in the light output. FIG. 9a shows intensity variations at multiples of 22 Hz for the three-level coding scheme. The lower frequency components at 22 Hz and 44 Hz are frequencies which might be perceptible to the human eye. FIG. 9b shows the predicted spectrum using the new Manchester coding. The first significant component in this spectrum appears at 100 Hz, which is already above the range of human perception.

Figure 10:
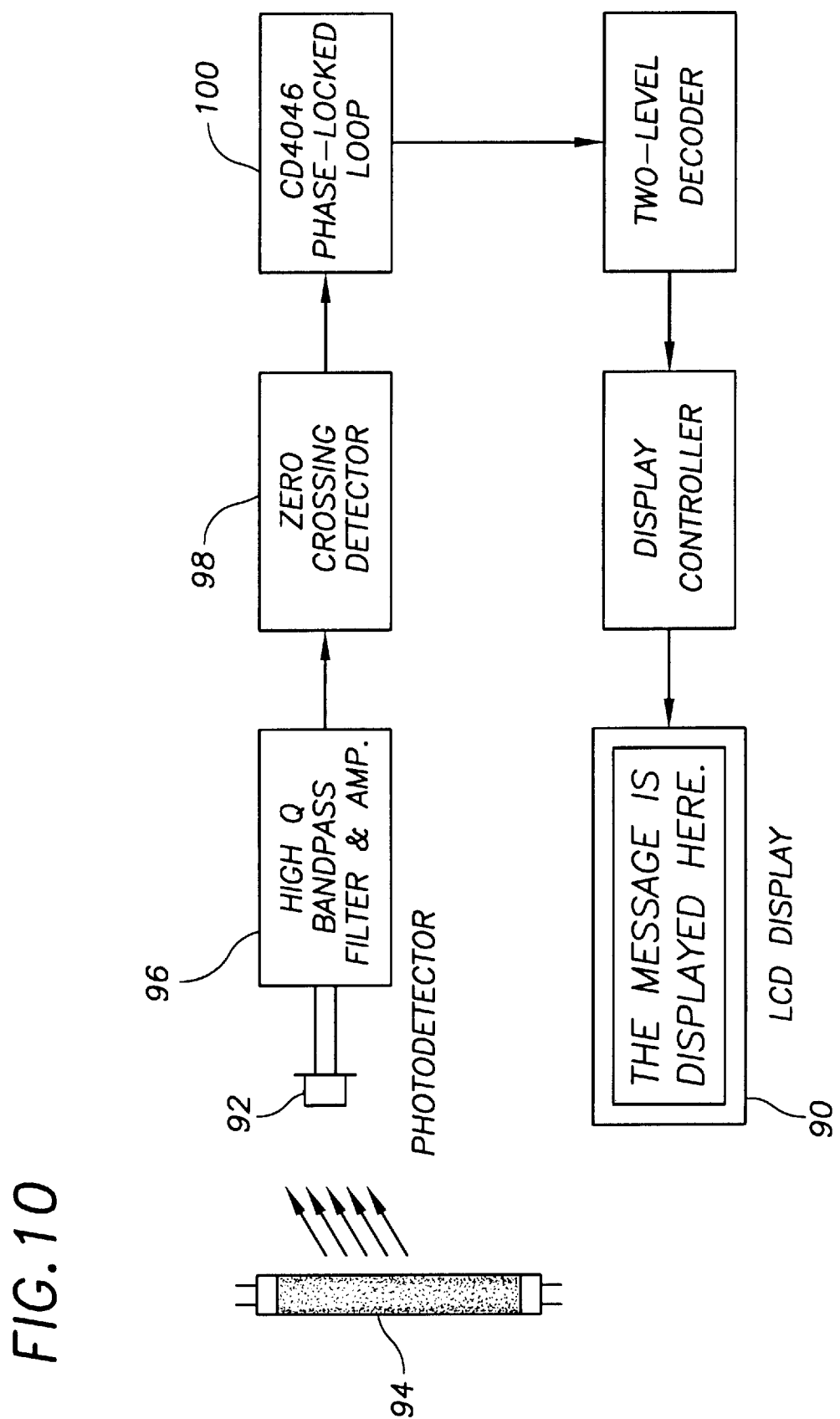
FIG. 10 is a block diagram illustrating a receiver architecture for decoding digital data transmitted by the light.

The modulated lamp light is detected and decoded by a receiver circuit. This receiver may take the form of a portable device where received information is displayed on a liquid-crystal display (LCD) 90 as shown in FIG. 10. A photodetector 92 is used to detect the light output of a fluorescent lamp 94. To help reject background variations in the ambient environment which are not caused by the operation of the transmitter, the photodetector signal is first passed through an analog bandpass filter and amplifier 96 in the receiver. Note that, while the arc frequency varies from 36 to 40 kHz, the received intensity signal varies from 72 to 80 kHz because the intensity varies with the magnitude and not the direction of the arc current. Zero crossings in the intensity signal are located using a comparator 98, and the frequency is tracked by a CD4046 phase-locked loop (PLL) 100.

The non-linear operation of the PLL loop 100 is critical to the increased performance of this invention. A conventional PLL circuit uses a feedback structure to track and output a voltage proportional to the frequency of an received signal. The performance of such a circuit can be accurately modeled, for small signal changes, as a linear system. The characteristics of the resulting linear system, such as its damping and settling time, affect the achievable data rate of the receiver system. The present invention significantly improves the performance of the PLL tracking performance in this application. This is accomplished by driving the PLL feedback loop into saturation at each of the received frequency limits. This establishes a situation where the PLL output voltage reaches saturation much faster than the settling time of the associated linear system.

Figure 11A:
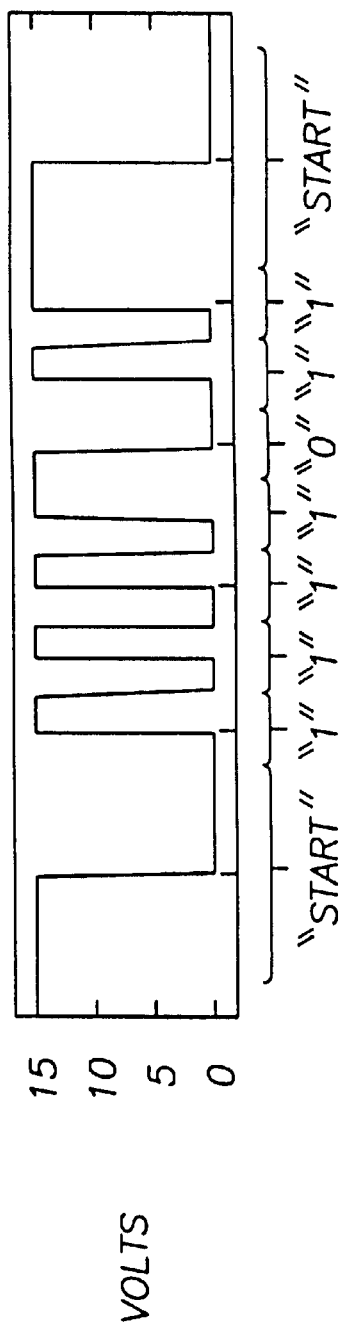
FIGS. 11a and 11b are graphs that show a comparison of sent and received encoded bits respectively in a prototype system.
Figure 11B:
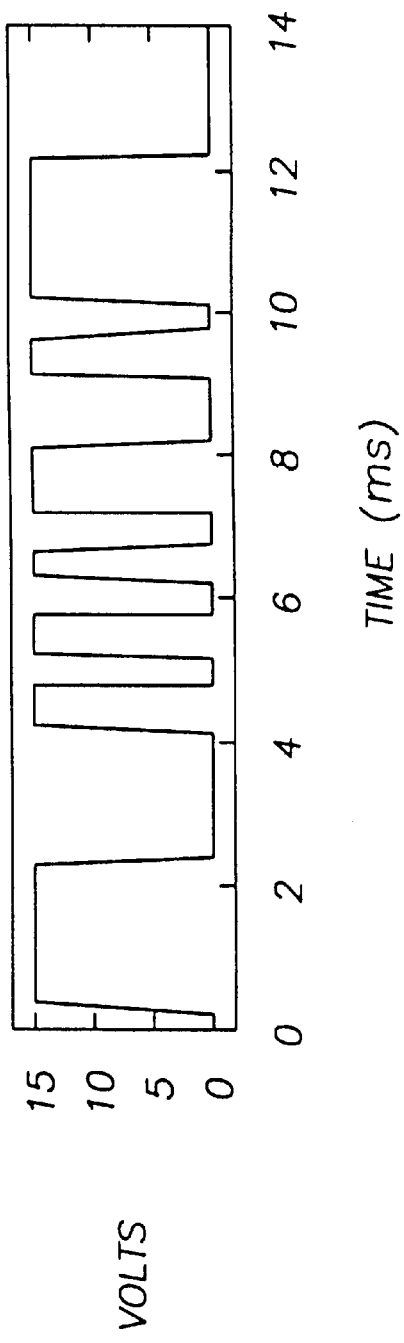

The non-linear behavior of the receiver is illustrated in FIGS. 11a and 11b. These figures show operating waveforms from an experimental prototype system. FIG. 11a shows the transmitter waveform that is used to modulate the frequency of the fluorescent lamp ballast, zero volts corresponds to a frequency of 36 kHz and 15 volts corresponds to 40 kHz. FIG. 11b shows resulting output of the PLL using the non-linear saturating feedback loop. The output very accurately tracks the frequency changes in the lamp light with virtually none of the settling characteristics of a typical PLL.

Decoding of the Manchester-encoded data is accomplished asynchronously by oversampling the comparator outputs and inspecting the received pulse widths. This makes the task of decoding the half-weight code more challenging than that of decoding the tri-level scheme published in T. Buffaloe, D. Jackson, S. Leeb, M. Schlecht, and R. Leeb, "Fiat Lux: A Fluorescent Lamp Transceiver," *Applied Power Electronics Conference*, Atlanta, Ga., June 1997. However, the improved data transmission rate of the half-weight scheme, and the ready availability of commercial single-chip decoders for half-weight coded data, make the half-weight codes highly attractive for this application.

In our text transceiver prototype, a display controller stores the decoded information and periodically updates the incoming message on a two-line, liquid crystal display. In general the received digital data stream could be used to deliver a visual (text) or audio message, or could be processed directly by computer or other information handling system. See copending application Ser. No. 09/291,709 filed Apr. 14, 1999 entitled "Communication System" and application Ser. No. 09/292,126 filed Apr. 14, 1999 entitled "Analog and Digital Electronic Receivers for Dual-Use Wireless Data Networks" the contents of which are incorporated herein by reference.

The prototype transmits messages stored in a memory. A data encoder for reading the message in memory and encoding the data with a half-weight scheme is shown in FIG. 12. The output waveform of this encoder could be used to drive one of the modulation circuits in FIGS. 7a, 7b and 7c, thus transmitting the stored message in memory over the lamp light. Of course, other sources of input could be used. Coupled with a power-line carrier modem, the transceiver set could be used as a paging system that broadcasts messages in near real-time. A transmitter network could be constructed in a building simply by installing new ballasts in existing fluorescent lamp fixtures, with no additional wiring. These fixtures make excellent transmission sources since they are designed to flood rooms with light, as opposed to custom wireless infra-red or low power radio-frequency transmitters.

The analog and digital half-weight frequency-modulated data-encoding schemes demonstrated here are by no means the only approaches for coding data in the lamp output. Other techniques might be used to improve transmission bandwidth or flexibility. We envision that orthogonal bit patterns could be employed in different lamp ballasts (or the same ballast dependent on a transmission "key code") to permit the transmission and reception of data on different channels in the same local area. One channel could be used, for instance, to provide location information, while another might be used for direct person-to-person paging. Also, note that a unique bit code could be appended to the beginning, end, or middle of each transmitted bit, byte, word, or page of digital data to mark it as belonging to a particular digital channel, analogous to a TV or radio channel. In this situation, a receiver could be programmed to present only data from a particular channel or set of channels, again creating the possibility of using either a single light or a single fixture to transmit multiple reception channels.

It should be realized by those skilled in the art that other, equivalent constructions to implement a transmitter which provides dual use of a radiation source, e.g., for illumination and also information transmission such as the system shown in FIG. 1, do not depart from the spirit and scope of the invention as set forth in the appended claims.

What is claimed is:

1. An apparatus for generating electromagnetic radiation having a first and second utility, the electromagnetic radiation being modulated to produce electronically detectable variations to achieve the second utility, the variations not affecting the first utility wherein;

the electromagnetic radiation comprises visible light; and the first utility is illumination and the second utility is the transmission of data, the variations in the visible light being imperceptible by a human eye regardless of the nature of data being transmitted.

2. The apparatus of claim 1 wherein the apparatus is a lamp.

3. An apparatus comprising:

a source of visible light capable of providing illumination and electronically detectable variations, the variations in the light effecting data transmission to a receiver and being imperceptible by a human eye; and circuitry, including a ballast for modulating the signal output from the source of visible light to effect data transmission, the transmission occurring by means of analog FM.

4. The apparatus of claim 3 wherein the circuitry further includes:

a rectifier for drawing power from a AC source and controlling the power to have substantially the same shape and phase, but possibly different amplitude, as the AC source to ensure near-unity-power-factor operation; and an inverter connected to receive power from the rectifier to create a high frequency alternating waveform, the output of the inverter forming an input to the lamp.

5. The apparatus of claim 4 wherein the inverter includes means for varying the frequency of the voltage produced by the inverter.

6. The apparatus of claim 4 wherein the inverter is operated in a zero-voltage switching mode.

7. The apparatus of claim 3 wherein the ballast further comprises a power supply and a safety isolation between the power supply and source of visible light.

8. The apparatus of claim 3 wherein the apparatus further comprises a source of data and the ballast includes safety isolation between the source of data and the circuitry.

9. The apparatus of claim 3 wherein the ballast operates as a transmitter in a transceiver set with a non-linear phase-locked loop in the receiver.

10. The apparatus of claim 3 wherein the ballast operates as a transmitter in a transceiver set with an analog FM receiver.

11. The apparatus of claim 3 wherein the ballast comprises a rectifier pre-regulator stage having a variable output voltage to provide light dimming operation.

12. The apparatus of claim 3 wherein the ballast operates with multiple sources of visible light.

13. The apparatus of claim 3 wherein said ballast operates from a DC power source.

14. The apparatus of claim 3 wherein the ballast operates from an AC power source.

15. The apparatus of claim 3 wherein said ballast is configured to allow multiple channels of data transmission from a single fixture, which fixture comprises at least one lamp.

16. The apparatus of claim 3 wherein said ballast operates as a transmitter in a transceiver set using two level digital pulse coding.

17. The apparatus of claim 3 wherein the data being transmitted is audio data.

18. The apparatus of claim 3 wherein the signal is restricted to exclude very low frequency content.

19. The apparatus of claim 3 wherein the variations in light are imperceptible by a human eye regardless of the nature of data being transmitted.

20. The apparatus of claim 3 wherein the data transmission occurs by use of the sideband FM method.

21. The apparatus of claim 3 wherein the data transmission occurs at a data rate of at least 250 bits per second.

22. The apparatus of claim 3 wherein the signal comprises a frequency spectrum restricted to minimize frequencies of less than 44 Hz.

23. An apparatus comprising:
   a source of visible light capable of providing illumination and electronically detectable variations, the variations effecting data transmission to a receiver and being imperceptible by a human eye; and
   circuitry, including a ballast for modulating the signal output from the source of visible light to effect data transmission, the transmission occurring by means comprising discrete pulse code FM with an orthogonal bit coding scheme.

24. The apparatus of claim 23 wherein the circuitry further includes:
   a rectifier for drawing power from an AC source and controlling the power to allow alterations in the signal amplitude without substantially affecting the signal shape or phase and provide near-unity-power factor operation; and
   an inverter connected to the rectifier for receiving power and creating a high frequency alternating waveform, the output of the inverter forming an input into the source of visible light.

25. The apparatus of claim 24 wherein the inverter includes a means for varying the frequency of the voltage produced by the inverter.

26. The apparatus of claim 24 wherein the inverter is operated in a zero-voltage switching mode.

27. The apparatus of claim 23 wherein the ballast further comprises a power supply and a safety isolation between the power supply and the source of visible light.

28. The apparatus of claim 23 wherein the apparatus further comprises a source of data and the ballast includes safety isolation between the source of data and the circuitry.

29. The apparatus of claim 23 wherein the ballast operates as a transmitter in a transceiver set with a non-linear phase-locked loop in the receiver.

30. The apparatus of claim 23 wherein the ballast operates as a transmitter in a transceiver set with an analog FM receiver.

31. The apparatus of claim 23 wherein the ballast comprises a rectifier pre-regulator stage having a variable output voltage to provide light dimming operation.

32. The apparatus of claim 23 wherein the ballast operates with multiple sources of visible light.

33. The apparatus of claim 23 wherein the ballast operates from a DC power source.

34. The apparatus of claim 23 wherein the ballast operates from an AC power source.

35. The apparatus of claim 23 wherein the ballast is configured to allow multiple channels of data transmission from a single fixture, which fixture comprises at least one lamp.

36. The apparatus of claim 23 wherein said ballast operates as a transmitter in a transceiver set using two level digital pulse coding.

37. The apparatus of claim 36 wherein the circuitry further includes:
   a rectifier for drawing power from an AC source and controlling the power to allow alternations in the signal amplitude without substantially affecting the signal shape or phase, to provide near-unity-power factor operation; and
   an inverter connected to the rectifier for receiving power and creating a high frequency alternating waveform, the output of the inverter forming an input into the source of visible light.

38. The apparatus of claim 37 wherein the inverter includes a means for varying the frequency of the voltage produced by the inverter.

39. The apparatus of claim 37 wherein the inverter is operated in a zero-voltage switching mode.

40. The apparatus of claim 36 wherein the ballast further comprises a power supply and a safety isolation between the power supply and the source of visible light.

41. The apparatus of claim 36 wherein the apparatus further comprises a source of data and the ballast includes safety isolation between the source of data and the circuitry.

42. The apparatus of claim 36 wherein the ballast operates as a transmitter in a transceiver set with a non-linear phase-locked loop in the receiver.

43. The apparatus of claim 36 wherein the ballast operates as a transmitter in a transceiver set with an analog FM receiver.

44. The apparatus of claim 36 wherein the ballast comprises a rectifier pre-regulator stage having a variable output voltage to provide light dimming operation.

45. The apparatus of claim 36 wherein the ballast operates with multiple sources of visible light.

46. The apparatus of claim 36 wherein the ballast operates from a DC power source.

47. The apparatus of claim 36 wherein the ballast operates from an AC power source.

48. The apparatus of claim 36 wherein the ballast is configured to allow multiple channels of data transmission from a single fixture, which fixture comprises at least one lamp.

49. The apparatus of claim 36 wherein the variations in the light are imperceptible by a human eye regardless of the nature of the data being transmitted.

50. The apparatus of claim 36 wherein the data transmission occurs at a data rate of at least 250 bits per second.

51. The apparatus of claim 36 wherein the signal comprises a frequency spectrum restricted to minimize frequencies of less than 44 Hz.

52. The apparatus of claim 23 wherein the variations in the light are imperceptible by a human eye regardless of the nature of data being transmitted.

53. The apparatus of claim 23 wherein data transmission occurs at a data rate of at least 250 bits per second.

54. The apparatus of claim 23 wherein the signal comprises a frequency spectrum restricted to minimize frequencies of less than 44 Hz.

* * * * *

UNITED STATES PATENT AND TRADEMARK OFFICE
CERTIFICATE OF CORRECTION

PATENT NO. : 6,198,230 B1
APPLICATION NO. : 09/291706
DATED : March 6, 2001
INVENTOR(S) : Steven B. Leeb et al.

It is certified that error appears in the above-identified patent and that said Letters Patent is hereby corrected as shown below:

In the Specification, Page 1, after the title insert the following text:

--This invention was made with government support under grants 1R43DC04015 awarded by the National Institutes of Health and other U.S. Government grants and contracts. The government has certain rights in the invention.--

Signed and Sealed this

Twentieth Day of January, 2009

JON W. DUDAS
*Director of the United States Patent and Trademark Office*

UNITED STATES PATENT AND TRADEMARK OFFICE
CERTIFICATE OF CORRECTION

PATENT NO. : 6,198,230 B1  
APPLICATION NO. : 09/291706  
DATED : March 6, 2001  
INVENTOR(S) : Steven B. Leeb et al.

Page 1 of 1

It is certified that error appears in the above-identified patent and that said Letters Patent is hereby corrected as shown below:

Column 1, line 3, after the title insert the following text:

--This invention was made with government support under grants 1R43DC04015 awarded by the National Institutes of Health and other U.S. Government grants and contracts. The government has certain rights in the invention.--

This certificate supersedes the Certificate of Correction issued January 20, 2009.

Signed and Sealed this

Tenth Day of February, 2009

JOHN DOLL  
*Acting Director of the United States Patent and Trademark Office*